United States Patent
Kormos et al.

(10) Patent No.: US 6,731,435 B1
(45) Date of Patent: May 4, 2004

(54) METHOD AND APPARATUS FOR DISPLAYING INFORMATION WITH A HEAD-UP DISPLAY

(75) Inventors: Alexander L. Kormos, Fairview, TX (US); Aaron T. Raines, Jr., Dallas, TX (US); Ning Wu, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/930,369

(22) Filed: Aug. 15, 2001

(51) Int. Cl.$^7$ ............... G02B 27/14; G09G 5/00
(52) U.S. Cl. ............... 359/630; 359/631; 359/633; 345/7; 345/8
(58) Field of Search ............... 359/629–633, 359/638–640, 838–840, 884, 742, 850, 865, 871, 874, 876; 345/7, 8, 11, 136

(56) References Cited

U.S. PATENT DOCUMENTS

| | | | |
|---|---|---|---|
| 2,716,193 A | 8/1955 | Riolo | 250/330 |
| 3,803,407 A | 4/1974 | Anderson | 250/214 VT |
| 3,887,273 A | 6/1975 | Griffiths | 712/218 |
| 4,052,123 A | 10/1977 | Yamazaki et al. | 359/742 |
| 4,131,818 A | 12/1978 | Wilder | 250/214 VT |
| 4,527,861 A | 7/1985 | Van Duyn | 359/606 |
| 4,740,780 A | 4/1988 | Brown et al. | 345/7 |
| 4,868,652 A | 9/1989 | Nutton | 348/167 |
| 4,919,517 A | 4/1990 | Jost et al. | 359/630 |
| 4,934,771 A | 6/1990 | Rogers | 359/356 |
| 4,961,625 A | 10/1990 | Wood et al. | 359/630 |

(List continued on next page.)

FOREIGN PATENT DOCUMENTS

| | | |
|---|---|---|
| DE | 26 33 067 A1 | 2/1978 |
| EP | 0 312 094 A2 | 4/1989 |
| EP | 0 321 149 | 6/1989 |
| EP | 0 515 328 A1 | 11/1992 |
| EP | 0 596 729 A2 | 5/1994 |
| EP | 0643 315 A1 | 3/1995 |
| EP | 0 710 866 A1 | 5/1996 |
| EP | 0 742 460 A2 | 11/1996 |
| EP | 0 818 701 A2 | 1/1998 |
| EP | 0 859 413 A2 | 8/1998 |
| FR | 2 693 807 | 1/1994 |
| GB | 1 584 573 | 2/1981 |
| GB | 2 246 900 A | 2/1992 |
| JP | 09185012 | 7/1997 |
| JP | 2000280823 | 10/2000 |
| WO | WO 89/03059 | 4/1989 |
| WO | WO 98/28602 | 7/1998 |
| WO | WO 99/33684 | 7/1999 |
| WO | WO 01/63232 A1 | 8/2001 |

OTHER PUBLICATIONS

Richards, Oscar W., "Visual Needs and Possibilities for Night Automobile Driving", American Optical Corporation, Southbridge, Massachusetts, 08/67, two cover pages, pp. i, iii, v, vii, ix, xi, 1–36, 38–66, and 124–138.

Scott, et al., "NVEOD FLIR92 Thermal Imaging Systems Performance Model", U.S. Army Night Vision and Electro–Optics Directorate, Fort Belvoir, Virginia, 10 unnumbered pages, date unknown.

(List continued on next page.)

*Primary Examiner*—Loha Ben
(74) *Attorney, Agent, or Firm*—Baker Botts L.L.P.

(57) ABSTRACT

A vehicle (10) has a camera (12) generating infrared images of a scene ahead, and a display (16) which reflects images from the vehicle windshield (17). Images from the camera are displayed at night, and operational information about the vehicle is displayed during the day. The display includes a mirror (41) with day and night reflective surfaces (162, 163) that have different optical characteristics and are arranged at an angle. The mirror is pivoted to transition the display unit between modes. In an alternative display (216), radiation from the two-sided mirror travels directly to a driver, without reflection from a windshield.

28 Claims, 5 Drawing Sheets

U.S. PATENT DOCUMENTS

| | | | |
|---|---|---|---|
| 4,970,653 A | 11/1990 | Kenue | 701/303 |
| 5,001,558 A | 3/1991 | Burley et al. | 348/164 |
| 5,013,135 A | 5/1991 | Yamamura | 359/630 |
| 5,023,451 A | 6/1991 | Burley | 250/330 |
| 5,028,119 A | 7/1991 | Hegg et al. | 359/632 |
| 5,056,890 A | 10/1991 | Iino et al. | 359/630 |
| 5,237,455 A | 8/1993 | Bordo et al. | 359/632 |
| 5,289,312 A | 2/1994 | Hashimoto et al. | 359/487 |
| 5,289,315 A * | 2/1994 | Makita et al. | 359/634 |
| 5,299,062 A | 3/1994 | Ogata | 359/571 |
| 5,361,165 A * | 11/1994 | Stringfellow et al. | 359/631 |
| 5,414,439 A | 5/1995 | Groves et al. | 345/7 |
| 5,497,271 A | 3/1996 | Mulvanny et al. | 359/631 |
| 5,504,622 A * | 4/1996 | Oikawa et al. | 359/630 |
| 5,506,595 A * | 4/1996 | Fukano et al. | 345/7 |
| 5,657,163 A | 8/1997 | Wu et al. | 359/630 |
| 5,729,016 A | 3/1998 | Klapper et al. | 250/334 |
| 5,731,903 A | 3/1998 | Cook | 359/633 |
| 5,734,357 A | 3/1998 | Matsumoto | 345/7 |
| 5,739,848 A | 4/1998 | Shimoura et al. | 348/119 |
| 5,748,377 A | 5/1998 | Matsumoto et al. | 359/630 |
| 5,781,243 A | 7/1998 | Kormos | 348/556 |
| 5,859,714 A | 1/1999 | Nakazawa et al. | 359/13 |
| 5,864,432 A | 1/1999 | Deter | 359/634 |
| 5,867,133 A | 2/1999 | Toffolo et al. | 345/7 |
| 5,973,827 A | 10/1999 | Chipper | 359/356 |
| 6,014,259 A | 1/2000 | Wohlstadter | 359/619 |
| 6,100,943 A * | 8/2000 | Koide et al. | 359/630 |
| 6,262,848 B1 | 7/2001 | Anderson et al. | 359/630 |
| 6,359,737 B1 * | 3/2002 | Stringfellow | 359/631 |
| 6,392,812 B1 | 5/2002 | Howard | 359/633 |
| 2002/0005999 A1 * | 1/2002 | Hutzel et al. | 359/838 |
| 2002/0063778 A1 | 5/2002 | Kormos | 348/148 |

OTHER PUBLICATIONS

RCA Electro–Optics Handbook "Detection, Resolution, and Recognition", RCA Solid State Division, Lancaster, Pennsylvania, 1974, two cover pages, Foreword, and pp. 118–121.

Fresnel Optics Brochure, Fresnel Optics Inc, Rochester, New York, date unknown, 8 pages.

Smith, Warren J., "Modern Optical Engineering—The Design of Optical Systems", McGraw–Hill, Inc., New York, New York, 1966, three cover pages, and pp. 104–109.

"FLIR92 Thermal Imaging Systems Performance Model—Analyst's Reference Guide", Document RG5008993, U.S. Army Night Vision and Electronic Sensors Directorate, Fort Belvoir, Virginia, 01/93, cover page, addendum page, pp. i–v and ARG–1–ARG–14.

Holst, Gerald C., "Testing and Evaluation of Infrared Imaging Systems", JCD Publishing Co., Maitland, Florida, 1993, three cover pages, and pp. 308–343.

U.S. Ser. No. 09/558,700, filed Apr. 25, 2000, entitled "Method and Apparatus for Obtaining Infrared Images in a Night Vision System", 30 pages of text and 3 pages of drawings (Attorney Docket No. 004578.1067).

U.S. Ser. No. 10/038,988, filed Jan. 4, 2002, entitled "System and Method for Providing Images for an Operator of a Vehicle", by Alexander L. Kormos, 28 pages of text and 3 pages of drawings (Attorney Docket No. 019469.0224).

U.S. Ser. No. 09/972,543, filed Oct. 8, 2001, entitled "System and Method for Forming Images for Display in a Vehicle", by Alexander L. Kormos, 39 pages of text and 4 pages of drawings (Attorney Docket No. 019469.0218).

U.S. Ser. No. 09/747,035, filed Dec. 21, 2000, entitled "Method and Apparatus for Reducing Distortion in a Displayed Image", by Douglas W. Anderson, 18 pages of text and 2 pages of drawings (Attorney Docket No. 004578.1095).

U.S. Ser. No. 10/163,343, filed Jun. 5, 2002, entitled "Method and System for Displaying an Image", 28 pages of text and 4 pages of drawings (Attorney Docket No. 019469.0226).

U.S. Ser. No. 10/162,797, filed Jun. 4, 2002, entitled "Method and System for Deploying a Mirror Assembly from a Recessed Position", 27 pages of text and 6 pages of drawings (Attorney Docket No. 019469.0227).

* cited by examiner

METHOD AND APPARATUS FOR DISPLAYING INFORMATION WITH A HEAD-UP DISPLAY

TECHNICAL FIELD OF THE INVENTION

This invention relates in general to techniques for displaying information and, more particularly, to a method and apparatus for displaying information to a person who is operating some type of equipment or device, such as the driver of a vehicle.

BACKGROUND OF THE INVENTION

Over the last several years, there has been an increase in the sale of automobiles having a head-up display (HUD) which is mounted in the dashboard, and which projects a visible image onto the inside surface of the windshield. The vast majority of these HUDs are used for night vision systems, in which an infrared camera unit is mounted at the front of the vehicle, for example in the center of the grille, and in which the HUD projects images from the camera unit onto the inside surface of the windshield during operation of the vehicle at night.

In this regard, the camera unit is capable of detecting thermal energy which originates at locations well beyond the range of the headlights. Thus, for example, if a person or a deer wanders into the road far ahead of the vehicle, the infrared camera unit will detect thermal energy from the person or deer well before the person or deer is illuminated by the headlights of the vehicle, and the HUD will produce a very visible indication to the driver that there is something in the road ahead. This facilitates safer driving at night.

The presentation of this information by means of a HUD makes this information more readily visible to the driver, who can easily see this information without taking his or her eyes off the road ahead. In contrast, if the information was displayed in the standard instrument cluster in the dashboard, rather than with a HUD, the driver would have to periodically take his or her eyes off the road and glance down at the instrument cluster in order to monitor this information.

It would be desirable to also use this type of HUD during the day. Of course, infrared images of the type displayed in the night mode would be of reduced value and interest in the day mode, but other information could be displayed, including operational information about the vehicle such as its current speed, Global Positioning Satellite (GPS) information such as the current location of the vehicle, and/or any other telematics that the driver might want to see. However, it has not previously been practical to provide such a system which has a size and cost suitable for the high-volume consumer market for automobiles and other vehicles.

In this regard, one consideration is that existing HUDs include a relatively large projection mirror with a high degree of reflectivity, in order to facilitate proper operation at night. During the day, however, this large and highly reflective mirror can take solar radiation which enters the HUD and focus this radiation onto the liquid crystal display (LCD) image source, or onto other parts that are made of plastic, causing physical damage to the LCD image source or other parts. As a result, commercially available HUDs often include a physically moveable shutter which is closed during the day so that little or no solar radiation can enter the HUD. However, while the shutter protects the HUD from damage caused by sunlight, it also prevents the HUD from being used during the day, because the HUD is prevented from projecting images onto the windshield when the shutter is closed.

A further consideration is that a suitable night vision infrared image, as presented to the driver, is customarily a low to medium resolution image having a horizontal field of view (FOV) of about 12°. There are commercially available LCD image sources which have been approved by vehicle manufacturers for use in automobiles, including an existing LCD which has a two-dimensional array of pixels configured as 320 pixels horizontally by 220 pixels vertically. This is a color device, in which each pixel actually includes a cluster of three pixel elements that respectively produce the three primary colors of red, green and blue, but for clarity here each such cluster of three pixel elements is referred to as a single pixel. This existing LCD is suitable for displaying a low to medium resolution night vision image with a 12° horizontal FOV. However, it is not suitable for displaying, with a horizontal FOV of about 12°, a satisfactory image of alpha-numeric or graphical information that would be desirable for a day mode of operation.

In more detail, existing displays for night mode operation generally provide about 4.6 pixels per milliradium to the eye of the driver in the 12° FOV. however, it is generally recognized that about 9 pixels per milliradium are needed to display alpha-numerical or graphical information of the type desired for a day mode of operation. Of course, it would be possible to provide a low resolution image source for use during the night mode and a separate high-resolution image source (such as a vacuum florescent display) for use during the day mode. However, the use of two separate sources is cost prohibitive as to the consumer vehicle market, and also presents the problem that it would be difficult or impossible to package both sources into the very limited physical space available for a HUD in a standard automobile dashboard.

Another possible approach would be to use a very high-resolution LCD image source for operation in both the day and night modes. However, no LCD manufacturer is currently known to offer such a device, and the cost of engineering and tooling needed to develop such a high-resolution LCD is very high.

SUMMARY OF THE INVENTION

From the foregoing, it may be appreciated that a need has arisen for a method and apparatus which facilitate the provision of a head-up display that is suitable for use in both a day mode and a night mode of operation, without any significant increase in size or cost in comparison to existing head-up displays that are operable only in a night mode. According to one aspect of the present invention, a method and apparatus are provided to address this need, and involve: using an image source to output radiation which represents a visible image; providing first and second reflective surfaces respectively having first and second reflection characteristics which are different; and directing the radiation from the image source to a viewing location according to a selected one of first and second modes, the first mode including reflection of radiation from the image source by the first reflective surface according to the first reflection characteristic, and the second mode including reflection of radiation from the image source by the second reflective surface according to the second reflection characteristic.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
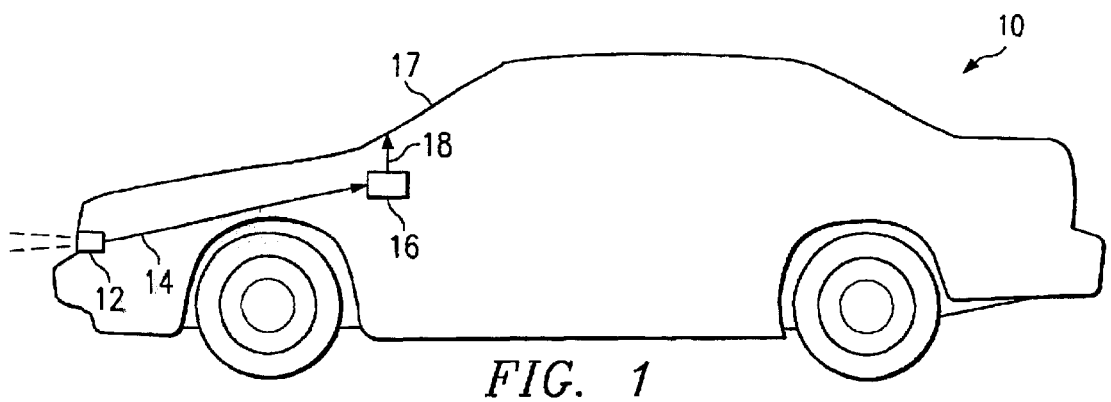
FIG. 1 is a diagrammatic view of a vehicle which includes a head-up display that embodies features of the present invention.

FIG. 1 is a diagrammatic view of an apparatus which is a vehicle 10 containing a system that embodies features of the present invention. The system includes a camera unit 12, which in the disclosed embodiment is mounted in the center of the grille at the front of the vehicle. The system also includes a display unit 16, to which the camera unit 12 is electrically coupled by a cable 14. The display unit 16 is mounted within an upwardly open recess provided in the top of the dashboard of the vehicle, and can project an image onto the inside surface of the windshield 17, as indicated diagrammatically by an arrow 18. The display unit 16 and the windshield 17 together form a head-up display (HUD).

The display unit 16 has two different operational modes, one of which is used at night and the other of which is used during the day. With respect to the night mode, the camera unit 12 is a type of device known in the art, which contains an infrared (IR) detector and can generate a series of IR images representing a scene ahead of the vehicle. As is known in the art, the IR images generated by the camera unit 12 can identify persons, animals and other sources of thermal energy that are beyond the effective reach of the illumination from the vehicle's headlights, thereby permitting the driver of the vehicle to operate the vehicle more safely.

For example, if an animal such as a deer happens to wander into the road ahead at a location well beyond the reach of the headlights, the thermal energy emitted by the deer's body will be detected by the camera unit 12, and will be distinctively visible in the IR images produced by the camera unit 12. In the night mode of operation, these images are projected onto the inner surface of windshield, thereby warning the driver of the presence of the deer, well before the driver can actually see the deer in the light from the headlights.

In the day mode operation, the IR camera unit 12 is not used, because the driver has much better natural visibility during the day, and the IR images add little to what the driver can see naturally. Instead, the display unit 16 projects onto the inner surface of the windshield certain information regarding the operational state of the vehicle, such as the speed at which the vehicle is currently traveling. This permits the driver to easily observe this type of operational data, without any need for the driver to repeatedly shift his or her gaze downwardly to the instrument cluster in the dashboard. This helps to reduces driver fatigue, and also facilitates safer driving by keeping important operational information more readily visible to the driver.

Figure 2:
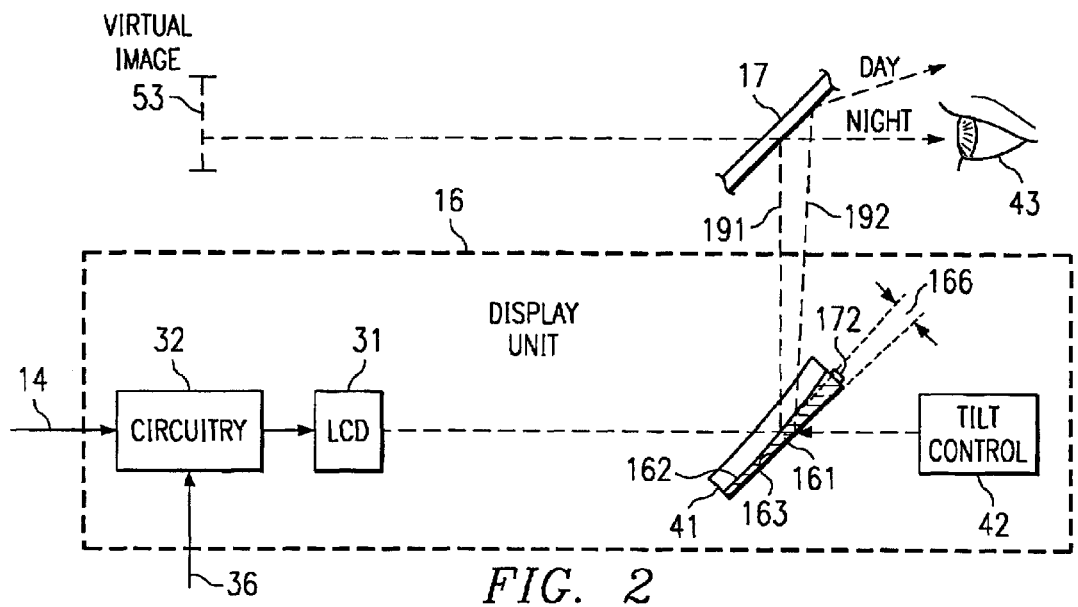
FIG. 2 is a diagrammatic view of the head-up display from the vehicle of FIG. 1, showing in more detail the internal configuration of a display unit which is part of the head-up display.
Figure 3:
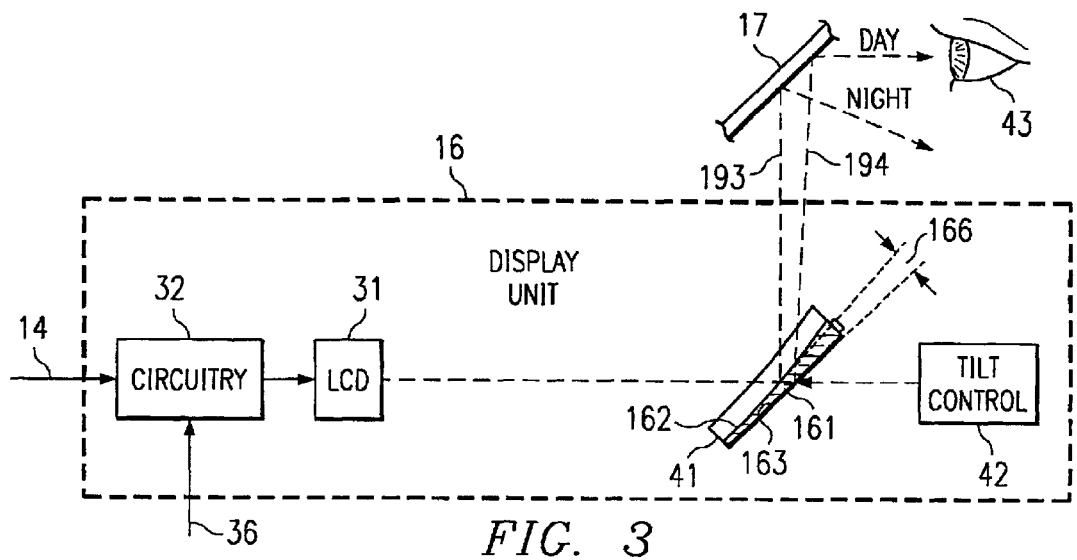
FIG. 3 is a diagrammatic view similar to FIG. 2, but showing a different operational position.

FIG. 2 is a diagrammatic view of the disclosed HUD, including the display unit 16 and the windshield 17, when the display unit 16 is in its night mode of operation. FIG. 3 is a diagrammatic view similar to FIG. 2, but showing the display unit 16 in its day mode of operation. With reference to FIG. 2, the display unit 16 includes a liquid crystal display (LCD) 31 which is controlled by circuitry 32, and serves as an image source. In the disclosed embodiment, the LCD 31 is a commercially available part of a type known to those skilled in the art, which produces color images. It has a two-dimensional array of pixels, configured as 320 pixels horizontally by 240 pixels vertically. Since the LCD 31 is a color device, each pixel actually includes a cluster of three pixel elements which can respectively generate the three primary colors of red, green and blue. However, in order to avoid confusion here, each such cluster of three pixel elements is referred to as a single pixel.

The circuitry 32 has an input coupled to an end of the cable 14, through which it receives the IR images generated by the camera unit 12. The circuitry 32 has a further input coupled to a cable 36. The cable 36 leads to a not-illustrated microprocessor of a type known in the art, which is an integral part of the vehicle 10 of FIG. 1 and which controls certain components within the vehicle, such as the instrument cluster embedded in the dashboard. Operational information regarding the vehicle is supplied to the circuitry 32 through the cable 36, such as the speed at which the vehicle is currently traveling.

The display unit 16 includes a mirror 41 which is supported for pivotal movement about an axis extending perpendicular to the drawing plane of FIG. 2. A tilt control mechanism 42 includes a not-illustrated electric motor coupled through a drive train to the mirror 41, in order to control the pivotal position of the mirror 41.

In the night mode of operation, which is depicted in FIG. 2, the circuitry 32 receives IR images from the camera unit 12 (FIG. 1), and displays these images on the LCD 31. In contrast, in the day mode of operation (FIG. 3), the circuitry 32 does not use the IR images which it receives through the cable 14. Instead, the circuitry 32 is responsive to the operational information regarding the vehicle which it receives through the cable 36, such as the current speed of the vehicle. The circuitry 32 causes the LCD 31 to display some or all of this information on the LCD 31.

In both the day and night modes of operation, the radiation emitted by the LCD 31 travels to and is reflected by the mirror 41, in a manner discussed in more detail later. The reflected radiation then travels generally upwardly to the inner surface of the windshield 17. Most of this radiation actually passes upwardly through the windshield 17, but the inner surface of the windshield has a small degree of reflectivity, which is sufficient to reflect a portion of the radiation toward the eye 43 of the driver, in a manner discussed in more detail later. Consequently, the driver sees at a location in front of the windshield a virtual image 53 of what it actually being displayed on the LCD 31.

Since different drivers have different physical heights, and may adjust the driver's seat to different positions of comfort, the exact location of the eye 43 relative to the vehicle will vary from driver to driver. Consequently, each driver can use the tilt control mechanism 42 to adjust the pivotal position of the mirror 41 so that radiation from the LCD 31 is properly directed to the eye 43 of that particular driver. Once a given driver has adjusted the mirror 41 to a suitable position, it should not be necessary for the driver to again to adjust the mirror 41 during normal use of the display unit 16 in either the day mode or night mode of operation.

With reference to FIG. 2, the mirror 41 has a body 161 which is made of material that is transparent to visible radiation, such as any suitable and commercially available polycarbonate material. The mirror 41 has a curved front surface 162 on the side thereof nearest the LCD 31, and has a curved rear surface 163 on the opposite thereof. The front and rear surfaces 162 and 163 have different optical prescriptions.

In this regard, one factor embodied in the prescriptions for the reflective surfaces 162 and 163 is the curvature of the windshield 17. The windshield 17 is depicted in FIG. 1 as if it is approximately planar. However, persons skilled in the art will recognize that most vehicles have a windshield with a somewhat asymmetric curvature, which can impart a degree of distortion to images reflected from the interior surface of the windshield. Therefore, the surfaces 162 and 163 of the mirror 41 each have an asymmetric curvature, which includes compensation for the asymmetric curvature of the windshield 17, so that images viewed by the eye 43 of the driver will be a relatively accurate version of the images produced by the LCD 31. Stated differently, the surfaces 162 and 163 of the mirror 41 each have a curvature designed to add distortion that cancels the distortion introduced by the curvature of the windshield 17.

Due to the fact that the asymmetric curvature of the windshield 17 will vary from one vehicle type to another, the prescriptions needed for the surfaces 162 and 163 will also vary from one vehicle type to another. Consequently, specific prescriptions are not set forth herein. Persons skilled in the art are familiar with the principles involved in determining the appropriate prescription for each of the front and rear surfaces 162 and 163 of the mirror 41, including the techniques involved in shaping these surfaces of mirror 41 so as to compensate for the asymmetric shape of the windshield 17. These techniques are therefore not described here in detail.

The front and rear surfaces 162 and 163 are arranged so as to have with respect to each other an effective angle 166 which is greater than about 2°, and which is approximately 3.5° in the disclosed embodiment. Stated differently, and as discussed in more detail later, when radiation from the LCD 31 impinges on the mirror 41 in a given direction, a portion of that radiation will be reflected by the front surface 162. The remainder will pass through the body 161 of the mirror and be reflected by the rear surface 163 in a direction which forms an angle of approximately 3.5° with respect to the portion of the radiation reflected by front surface 162.

Figure 4:
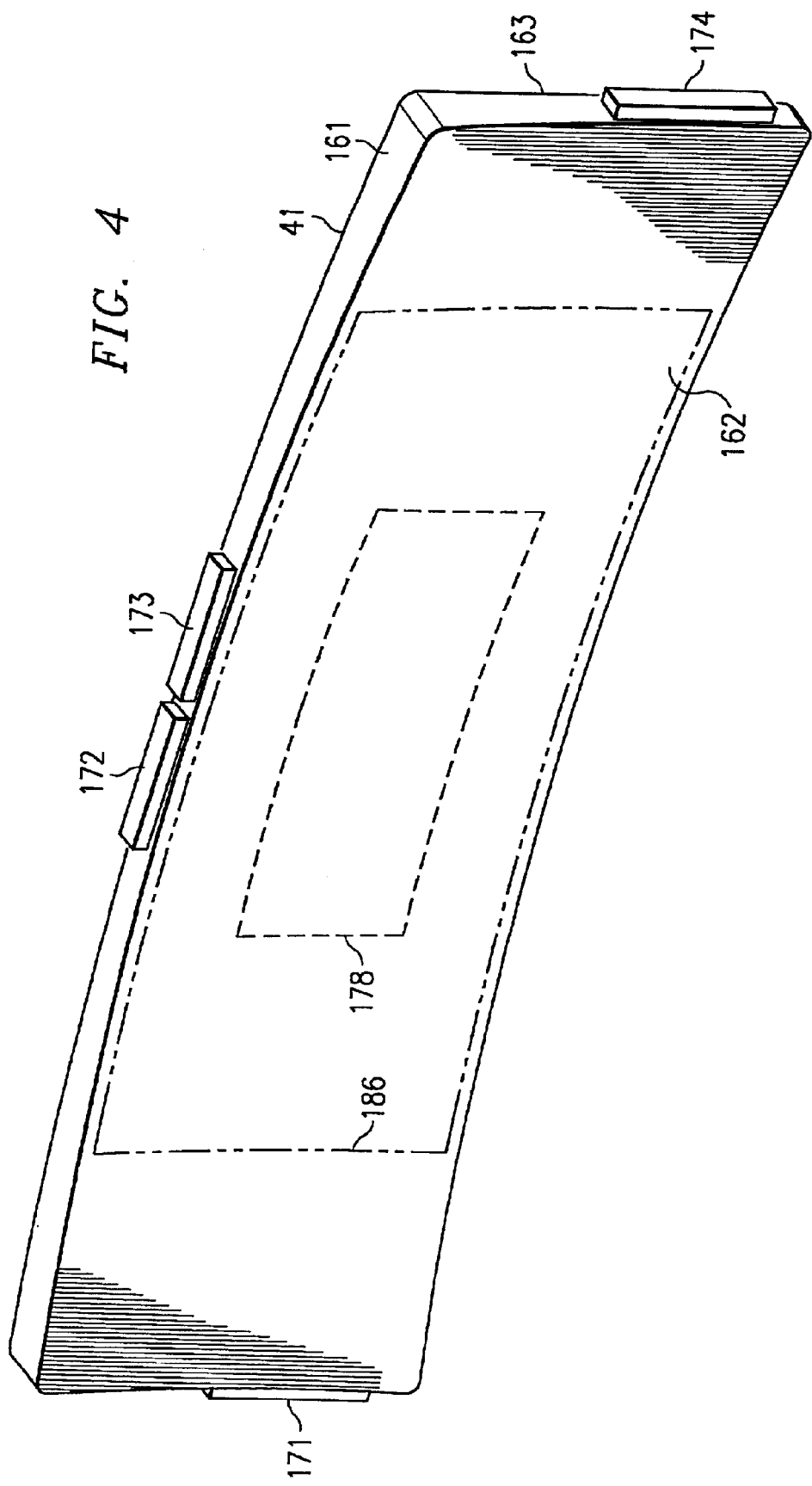
FIG. 4 is a diagrammatic perspective view of a mirror which is a component of the embodiment of FIG. 2.

Turning in greater detail to the mirror 41, FIG. 4 is a diagrammatic perspective view of the front side of the mirror 41. The mirror 41 includes four tabs 171–174 that are fixedly secured to edges of the body 161, the tabs 171 and 174 being provided at opposite ends, and the tabs 172 and 173 being provided near each other on the top edge of the mirror. The tabs 171–174 are used to facilitate the mechanical support of the mirror 41 within the display unit 16. A detailed comprehension of the mechanical support of the mirror 41 is not needed in order to understand the present invention, and the mechanical support of the mirror is therefore not illustrated and described here in detail.

Figure 5:
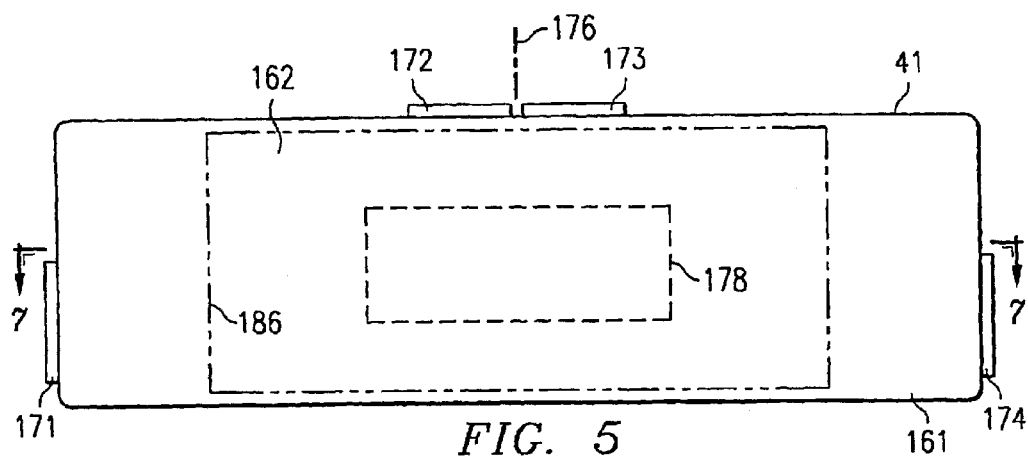
FIG. 5 is a diagrammatic front view of the mirror of FIG. 4.
Figure 6:
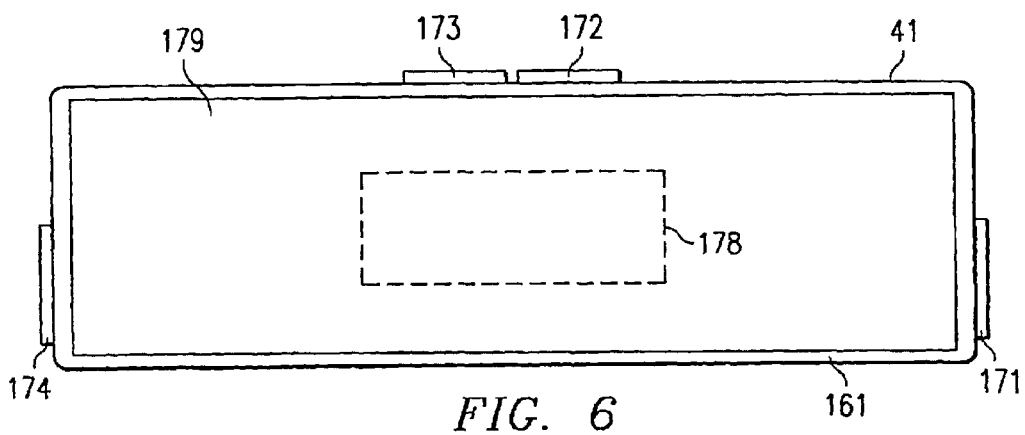
FIG. 6 is a diagrammatic rear view of the mirror of FIG. 4.
Figure 7:
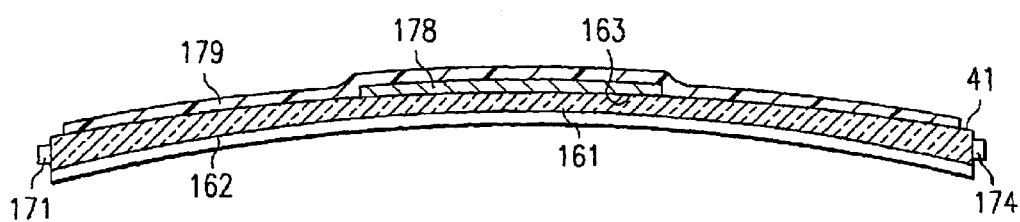
FIG. 7 is a sectional top view of the mirror of FIG. 4, taken along the line 7—7 in FIG. 5.

FIG. 5 is a diagrammatic front view of the mirror 41, FIG. 6 is a diagrammatic rear view of the mirror 41, and FIG. 7 is a sectional top view of the mirror 41, taken along the line 7—7 in FIG. 5. In FIG. 5, reference numeral 176 designates an imaginary vertical plane which is perpendicular to the plane of FIG. 5 and which bisects the mirror 41. The view of the mirror 41 in FIG. 2 is a sectional view that corresponds to the section plane indicated diagrammatically at 176 in FIG. 5.

As best seen in FIGS. 5 and 7, a highly reflective aluminum coating 178 is provided on a central portion of the rear surface of the body 161. As evident from FIG. 5, the coating 178 is approximately rectangular, with a width that is roughly a third of the overall width of the body 161, and with a height that is roughly a third of the overall height of the body 161. The thickness of the coating 178 is exaggerated in FIG. 7 for purposes of clarity. The front side of the aluminum coating 178 defines the highly reflective surface 163 on the rear side of the mirror 41, and reflects virtually all of the radiation that impinges on it.

A coating 179 of a non-reflective material is provided over the back of the reflective coating 178 and, as best seen in FIG. 6, covers substantially the entire rear surface of the body 161 of the mirror. In the disclosed embodiment, the coating 179 is a black material of a type known to those skilled in the art, which absorbs substantially all visible light that impinges on it. The coating 179 reduces or eliminates stray reflections from portions of the rear surface of the body 161 that are disposed outwardly from the aluminum coating 178. The thickness of the coating 179 is exaggerated in FIG. 7, for purposes of clarity.

In FIGS. 4 and 5, reference numeral 186 designates a broken line which identifies a rectangular portion of the front surface 162 on the body 161. In the disclosed embodiment, the front surface 162 does not have any coating thereon, and reflects only about 4% of the visible light which impinges on any given point within the region 186 of the front surface 162. However, it would alternatively be possible to apply to the front surface 162 a coating of a material with an index of refraction that would alter the degree of reflectivity provided by the front surface.

With reference to FIGS. 4 and 5, and as discussed in more detail later, the entire rectangular image from the LCD 31 (FIG. 2) is reflected by the region 186 of the front surface 162 during the night mode of operation of the display unit 16. This does not mean that 100% of the radiation from the LCD 31 is reflected by the region 186 because, as mentioned above, only about 4% of the radiation impinging on any particular point in the region 186 is reflected. However, the 4% of the radiation which is reflected does embody the entire rectangular image from the LCD 31. In contrast, in the day mode of operation, and due to the fact that the optical prescription of the rear surface 163 is different from that of the front surface 161, the entire rectangular image from the LCD 31 is reflected by the somewhat smaller rectangular reflective coating 178. The degree of reflection by the surface 163 is in excess of 90%.

As mentioned above, FIG. 2 depicts the operation of the display unit 16 during the night mode of operation. A rectangular image in the form of radiation from the LCD 31 travels to the mirror 41, and approximately 4% of this radiation is reflected by the region 186 (FIG. 4) of the front surface 162 of the mirror, and travels along an optical path 191 to the eye 43 of the driver. The remainder of the radiation from the LCD 31, which is not reflected by the front surface 162, passes through the body 161 of the mirror. Any of this radiation which reaches the non-reflective coating 179 (FIG. 7) is absorbed, but the portion of this radiation which reaches the reflective coating 178 is reflected virtually in its entirety along an optical path 192, which as explained above forms an angle of approximately 3.5° with respect to the reflected radiation at 191. The radiation at 192 is reflected by the inner surface of the windshield 17 but, due to the 3.5° angle between 191 and 192, passes somewhat above the eye 43 of the driver.

In order to switch the display unit 16 from the night mode to the day mode, the driver presses a not-illustrated button, which causes the tilt control mechanism 42 to pivot the mirror 41 by approximately 3.5°, from the pivotal position shown in FIG. 2 to the pivotal position shown in FIG. 3. With reference to FIG. 3, the rectangular image in the form of radiation from the LCD 31 travels to the mirror 41, where approximately 4% is reflected by the portion 186 of the front surface 162 of the body 161, and travels upwardly at 193. This radiation is reflected by the inner surface of the windshield 17 and passes below the eye 43 of the driver. The portion of the radiation from the LCD 31 which is not reflected by the front surface 162 travels through the body 161, and then the peripheral portion of this radiation is absorbed by the coating 179, while the central portion of this radiation is reflected virtually in its entirety by the aluminum coating 178 that defines the rear reflective surface 163. This reflected radiation travels upwardly at 194, at an angle of approximately 3.5° with respect to the radiation reflected at 193 by the front surface 162. The radiation at 194 is reflected by the inner surface of the windshield 17, and travels to the eye 43 of the driver.

As viewed from the eye 43 of the driver, and due to the different optical prescriptions of the front and rear surfaces 162 and 163 of the mirror 41, the entire rectangular image produced by the LCD 41 fills the region 186 of the front surface 162 of the mirror 41 in the night mode, whereas in the day mode the entirety of this same rectangular image fills the region 178 defining the reflective rear surface of the mirror. It will be noted that the width of the coating 178 is approximately half the width of the region 186, and the height of the coating 178 is approximately half the height of the region 186. Consequently, the eye 43 sees an image in the night mode with a horizontal field of view (FOV) of about 12°, and sees an image in the day mode with a horizontal FOV of about 6°. Thus, in the day mode of operation, the eye 43 sees an image which is about one-quarter the size of the image seen by the eye in the night mode, but which has a higher effective resolution because it has the same number of pixels as the larger image presented in the night mode.

One reason for providing two different reflective surfaces 162 and 163 on the mirror 41 is to limit the amount of sunlight which can reach the LCD 31 when the display unit is operating in the day mode. In this regard, the sun will be almost directly over the vehicle in the middle of the day, and sunlight will thus travel almost directly downwardly through the windshield 17 to the mirror 41. If, instead of the mirror 41, the display unit 16 had a standard HUD projection mirror with a single large and highly reflective surface, the standard mirror would tend to reflect and partially focus all of the incoming sunlight and heat onto the LCD 31 and various parts in the region thereof, some of which may be made of plastic in order to minimize the weight and cost of the display unit 16. Over time, this concentrated light and heat could physically damage the LCD 31 and/or adjacent parts.

However, the mirror 41 avoids this. More specifically, it will be noted that the only highly reflective portion of the mirror 41 is the aluminum coating 178. Thus, to the extent that downwardly-traveling sunlight enters the display unit 16 during the day, the only portion of the mirror 41 that can efficiently reflect a substantial amount of this sunlight toward the LCD 31 is the aluminum coating 178, which is relatively small in comparison to the overall size of the mirror 41. The reflective surface 162 on the front of the mirror 41 is, of course, much larger, but is also much less reflective, and in particular reflects only about 4% of the radiation which impinges on it. Consequently, while the entire front surface 162 of the mirror can reflect radiation toward the LCD 31, this will only be about 4% of the incoming sunlight impinging on this front surface 162, which is a negligible amount of sunlight. Thus, the display unit 16 is not only capable of operating in both a day mode and a night mode, but also requires no moveable shutter to protect certain internal components from damage due to sunlight during the day.

Figure 8:
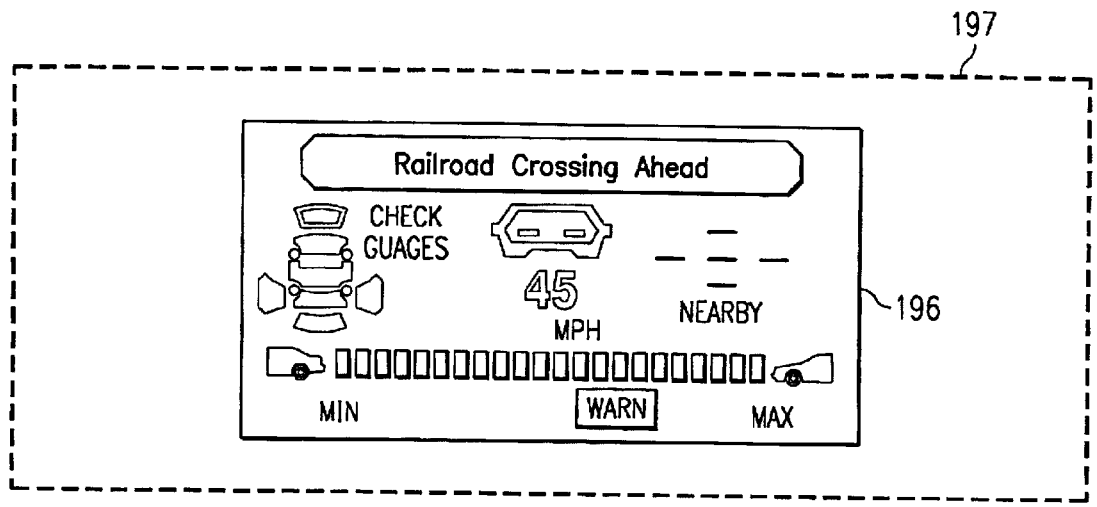
FIG. 8 is a diagrammatic view of an example of an image that can be displayed by the head-up display of FIG. 2 during daytime operation, with a broken line indicating the effective size of an image generated by the same head-up display during night operation.

FIG. 8 is a diagrammatic view of an image 196 as it would appear to the eye 43 of the driver of the vehicle 10. The image 196 is one example of an image which can be generated by the LCD 31 in the day mode of operation, and presents the driver with operational information regarding vehicle, such as the current speed of the vehicle. The image 196 has been reflected by the reflective surface 163 on the front side of the aluminum coating 178 (FIG. 4), and represents the entire two-dimensional array of 320 by 240 pixels in the LCD 31. The image 196 represents a horizontal FOV of approximately 6° for the driver.

The broken line 197 in FIG. 8 is a diagrammatic representation of the somewhat larger image which the eye 43 of the driver would see during the night mode of operation, after reflection by the region 186 of the front surface 162 (FIG. 4) of the mirror 41. The driver sees the image 197 with a horizontal FOV of approximately 12°. The image 197 also corresponds to the entire two-dimensional array of 320 by 240 pixels in the LCD 31. The image 196 is thus smaller than the image 197, but has a higher effective resolution as viewed by the eye of the driver.

Figure 9:
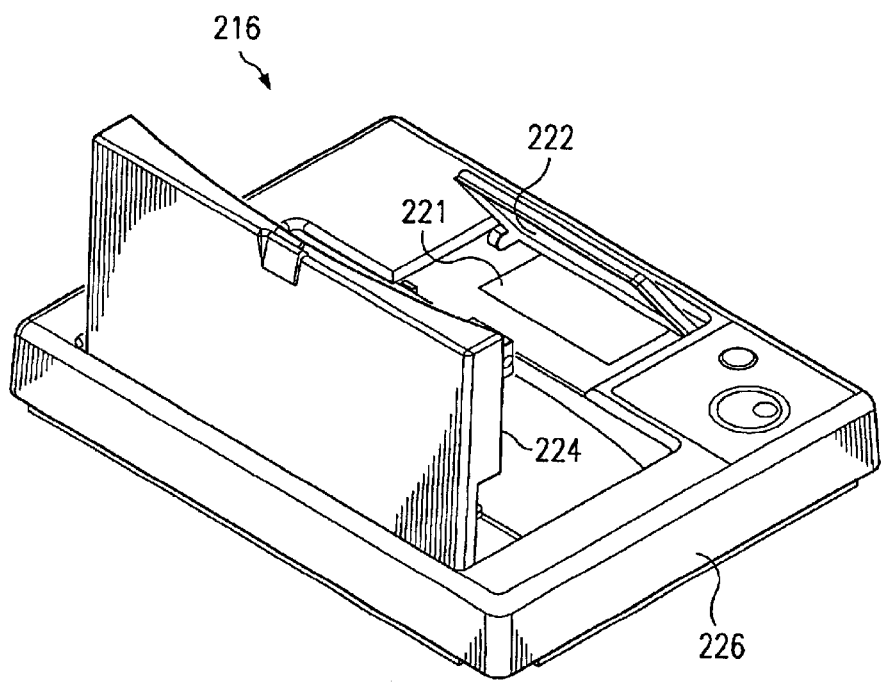
FIG. 9 is a diagrammatic perspective view of a display unit which is an alternative embodiment of the display unit shown in FIG. 2, and which embodies features of the present invention.
Figure 10:
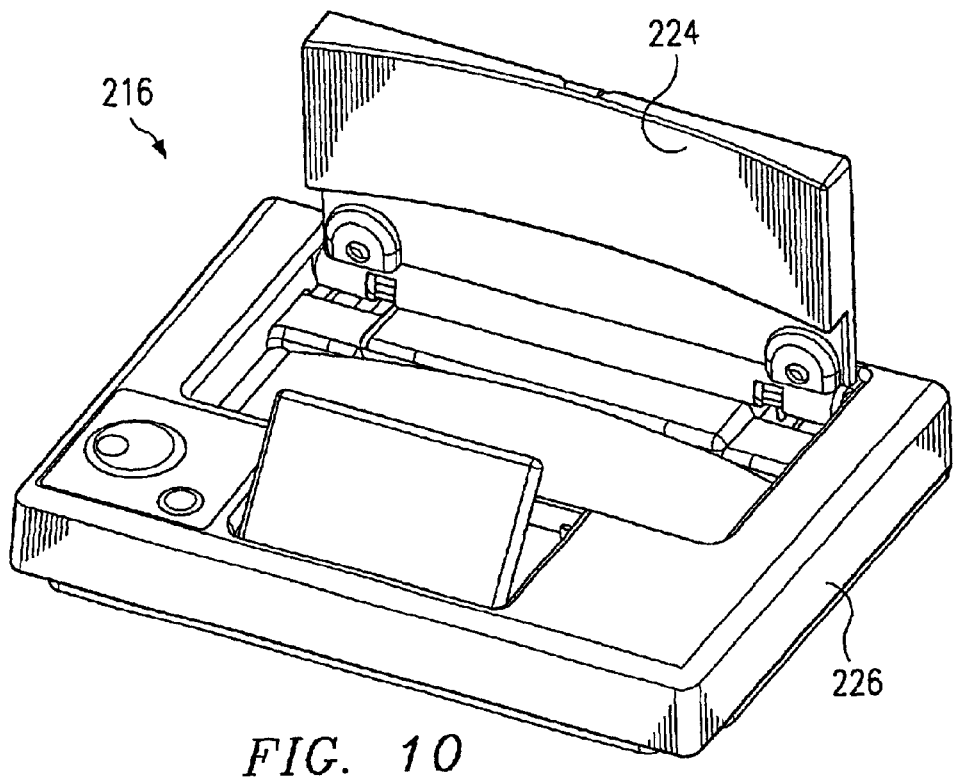
FIG. 10 is another diagrammatic perspective view of the display unit of FIG. 9, taken in a different direction.

FIG. 9 is a diagrammatic perspective view of a display unit 216 which is a further alternative embodiment of the display unit 16 shown in FIG. 2. FIG. 10 is another diagrammatic perspective view of the display unit 216, taken from a different angle. The display unit 216 may be mounted permanently or removably on top of the dashboard of a vehicle.

One significant difference between the display unit 216 and the previously-described display unit 16 (FIG. 2) is that the display unit 216 does not utilize a reflection of radiation from the inner surface of the windshield of the vehicle. In this regard, the display unit 216 has an LCD 221 equivalent to the LCD shown at 31 in FIG. 2, a planar fold mirror 222, and an aspheric mirror 224. The aspheric mirror 224 is similar in structure and operation to the mirror 41 discussed above in association with FIGS. 2–8, except that the optical prescriptions are different, for example because the image is not reflected from a windshield and thus the mirror 224 does not need to take into account the asymmetrical curvature of a windshield. In fact, since the prescription for the mirror 224 does not have to compensate for the asymmetric curvature of a windshield, the display 216 can be moved from vehicle to vehicle without any need for modification of the mirror 224.

Radiation from the LCD 221 travels upwardly to the fold mirror 222, and is reflected toward the projection mirror 224. This radiation is then reflected by the mirror 224 directly toward the eye of the driver, without being directed toward and reflected from the windshield of the vehicle. Reflection of radiation by the mirror 224 for the day mode and for the night mode occurs in a manner similar to that described above in association with the mirror 41. In this regard, the mirror 224 is supported for pivotal movement relative to a base 226, and a motorized mechanism which is not illustrated can position the mirror 224 in a pivotal position that is comfortable for the driver, and can also effect pivotal movement of the mirror 224 by about 3.5°, in order to shift the mirror 224 between positions for the day mode and the night mode.

Figure 11:
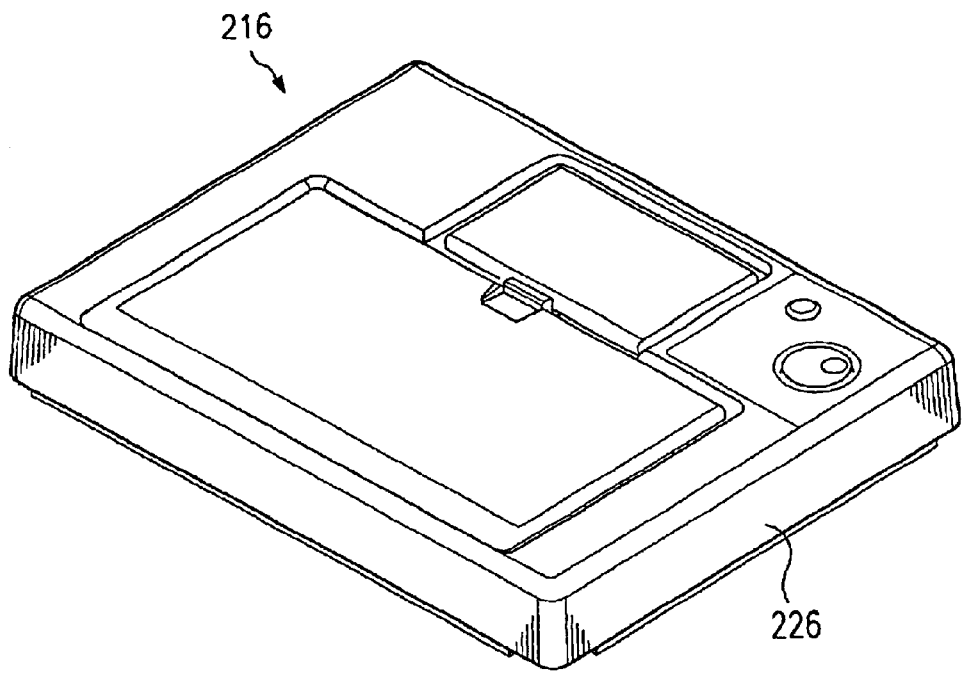
FIG. 11 is a diagrammatic perspective view of the display unit of FIG. 9, when the display unit is in a non-operational state.

The fold mirror 222 is also supported for pivotal movement, but only for purposes of moving it between an operational position and a non-operational position. The fold mirror 222 does not move during normal operation of the display unit 216. When the display unit 216 is not being used, the panels which pivotally support the mirrors 224 and 222 can both be pivoted downwardly to a non-operational position in which they are both substantially horizontal. In this regard, FIG. 11 is a diagrammatic perspective view of the display unit 216, and shows the horizontal positions of the two panels that respectively support the mirrors 222 and 224.

The present invention provides a number of technical advantages. One such technical advantage is that both a day mode of operation and a night mode of operation are provided in a HUD which has approximately the same size and cost as pre-existing HUDs that offer only a night mode of operation. A related advantage is that this can be achieved by replacing the standard projection mirror from a pre-existing HUD with a mirror having two surfaces with respective different optical prescriptions, one of which is used in the day mode and the other of which is used in the night mode.

A further advantage results from the capability to avoid introducing large amounts of sunlight into a HUD during the day, which in turn avoids solar damage to an image source and other components within the HUD. One approach for achieving this involves use of a mirror which has two surfaces with different prescriptions. One surface has a relatively large area with a relatively small degree of reflectivity, and is used during the night mode. The other surface has a significantly smaller area which is highly reflective, and is used during the day mode.

Still another advantage is that a HUD embodying the invention can be implemented with a single pre-existing image source, in a manner providing a lower resolution image with a wide field of view in the night mode, and a higher resolution image with a narrower field of view in the day mode. A related advantage is that the different resolutions and fields of view can be achieved with a single mirror having two surfaces, one of which is larger and has a higher degree of magnification than the other.

Although selected embodiments have been illustrated and described in detail, it will be understood that various substitutions and alternations are possible without departing from the spirit and scope of the present invention, as defined by the following claims.

What is claimed is:

1. An apparatus comprising a head-up display, said head-up display including:
   an image source which outputs radiation representing a visible image; and
   optical structure for directing the radiation from said image source to a viewing location, said optical structure including first and second reflective surfaces having first and second reflection characteristics which are different, and being selectively operable in one of first and second modes, said first mode including reflection of radiation from said image source by said first reflective surface according to said first reflection characteristic, and said second mode including reflection of radiation from said image source by said second reflective surface according to said second reflection characteristic;
   wherein said second reflection characteristic involves a smaller area of reflection than said first reflection characteristic.

2. An apparatus according to claim 1, wherein said first reflection characteristic involves a greater degree of magnification than said second reflection characteristics.

3. An apparatus according to claim 2, wherein said second reflection characteristic involves reflection with a higher degree of reflectivity than said first reflection characteristic.

4. An apparatus according to claim 1, wherein said second reflection characteristic involves reflection with a higher degree of reflectivity than said first reflection characteristic.

5. An apparatus comprising a head-up display, said head-up display including:
   an image source which outputs radiation representing a visible image; and
   optical structure for directing the radiation from said image source to a viewing location, said optical structure including first and second reflective surfaces having first and second reflection characteristics which are different, and being selectively operable in one of first and second modes, said first mode including reflection of radiation from said image source by said first reflective surface according to said first reflection characteristic, and said second mode including reflection of radiation from said image source by said second reflective surface according to said second reflection characteristic;
   wherein said first reflection characteristic involves a higher degree of magnification than said second reflection characteristic.

6. An apparatus comprising a head-up display, said head-up display including:
   an image source which outputs radiation representing a visible image; and
   optical structure for directing the radiation from said image source to a viewing location, said optical structure including first and second reflective surfaces having first and second reflection characteristics which are different, and being selectively operable in one of first and second modes, said first mode including reflection of radiation from said image source by said first reflective surface according to said first reflection characteristic, and said second mode including reflection of radiation from said image source by said second reflective surface according to said second reflection characteristic;
   wherein said second reflection characteristic involves reflection with a higher degree of reflectivity than said first reflection characteristic.

7. An apparatus according to claim 6,
wherein radiation which reaches said viewing location in said first mode according to said first reflection characteristic has been reflected by said first reflective surface but is free of reflection by said second reflective surface; and
wherein radiation which reaches said viewing location in said second mode according to said second reflection characteristic has been reflected by said second reflective surface but is free of reflection by said first reflective surface.

8. An apparatus according to claim 7, including a part which has said first and second reflective surfaces thereon, and which is supported for movement between first and second positions, said part being in said first position in said first mode and being in said second position in said second mode.

9. An apparatus according to claim 6, including a vehicle, said head-up display being a part of said vehicle, and a windshield of said vehicle serving as a reflective surface which is a part of said optical structure.

10. An apparatus comprising a head-up display, said head-up display including:
an image source which outputs radiation representing a visible image; and
optical structure for directing the radiation from said image source to a viewing location, said optical structure including first and second reflective surfaces having first and second reflection characteristics which are different, and being selectively operable in one of first and second modes, said first mode including reflection of radiation from said image source by said first reflective surface according to said first reflection characteristic, and said second mode including reflection of radiation from said image source by said second reflective surface according to said second reflection characteristic;
wherein radiation which reaches said viewing location in said first mode according to said first reflection characteristic has been reflected by said first reflective surface but is free of reflection by said second reflective surface;
wherein radiation which reaches said viewing location in said second mode according to said second reflection characteristic has been reflected by said second reflective surface but is free of reflection by said first reflective surface;
including a part which has said first and second reflective surfaces thereon, and which is supported for movement between first and second positions, said part being in said first position in said first mode and being in said second position in said second mode;
wherein said part is made of a material transmissive to visible radiation;
wherein said first and second reflective surfaces are provided on opposite sides of said part;
wherein said first reflective surface is partially reflective to radiation from said image source;
wherein radiation from said image source reaches said first reflective surface before said second reflective surface so that a portion of the radiation is reflected by said first reflective surface and the remainder of the radiation travels through said part to said second reflective surface; and
wherein said first and second reflective surfaces are arranged at an angle to each other so that the portion of the radiation from said image source which is reflected by said first reflective surface travels in a direction different from the portion of that radiation which is reflected by said second reflective surface.

11. An apparatus according to claim 10, wherein said movement of said part between said first and second positions is pivotal movement.

12. An apparatus according to claim 10, wherein said first reflective surface reflects a substantially smaller portion of the radiation from said image source than said second reflective surface.

13. An apparatus according to claim 10, wherein said first and second reflective surfaces have different optical prescriptions.

14. An apparatus according to claim 10, wherein said second reflective surface is substantially smaller in size than said first reflective surface.

15. An apparatus according to claim 14, wherein said second reflective surface includes a highly reflective coating provided on said part, and reflects substantially all of the radiation from said image source which reaches said second reflective surface.

16. An apparatus according to claim 15, including a further coating made of a material which absorbs light, and which is provided over and is larger than said highly reflective coating.

17. An apparatus according to claim 14, wherein said first reflective surface provides a higher degree of magnification than said second reflective surface.

18. An apparatus comprising a head-up display, said head-up display including:
an image source which outputs radiation representing a visible image; and
optical structure for directing the radiation from said image source to a viewing location, said optical structure including first and second reflective surfaces having first and second reflection characteristics which are different, and being selectively operable in one of first and second modes, said first mode including reflection of radiation from said image source by said first reflective surface according to said first reflection characteristic, and said second mode including reflection of radiation from said image source by said second reflective surface according to said second reflection characteristic;
wherein said first and second reflective surfaces are each configured to minimize an amount of ambient light from externally of said head-up display which is reflected thereby in a direction toward said image source.

19. A method of operating a head-up display, comprising the steps of:
using an image source to output radiation which represents a visible image;
providing first and second reflective surfaces respectively having first and second reflection characteristics which are different;
directing the radiation from said image source to a viewing location according to a selected one of first and second modes, said first mode including reflection of radiation from said image source by said first reflective surface according to said first reflection characteristic, and said second mode including reflection of radiation from said image source by said second reflective surface according to said second reflection characteristic; and configuring said second reflection characteristic to utilize a smaller area of reflection than said first reflection characteristic.

20. A method according to claim 19, including the step of configuring said first reflection characteristic to have a higher degree of magnification than said second reflection characteristic.

21. A method according to claim 20, including the step of configuring said second reflection characteristic to involve a higher degree of reflectivity than said first reflection characteristic.

22. A method according to claim 19, including the step of configuring said second reflection characteristic to involve a higher degree of reflectivity than said first reflection characteristic.

23. A method of operating a head-up display, comprising the steps of:

using an image source to output radiation which represents a visible image;

providing first and second reflective surfaces respectively having first and second reflection characteristics which are different;

directing the radiation from said image source to a viewing location according to a selected one of first and second modes, said first mode including reflection of radiation from said image source by said first reflective surface according to said first reflection characteristic, and said second mode including reflection of radiation from said image source by said second reflective surface according to said second reflection characteristic; and configuring said first reflection characteristic to involve a higher degree of magnification than said second reflection characteristic.

24. A method of operating a head-up display, comprising the steps of:

using an image source to output radiation which represents a visible image;

providing first and second reflective surfaces respectively having first and second reflection characteristics which are different;

directing the radiation from said image source to a viewing location according to a selected one of first and second modes, said first mode including reflection of radiation from said image source by said first reflective surface according to said first reflection characteristic, and said second mode including reflection of radiation from said image source by said second reflective surface according to said second reflection characteristic; and configuring said second reflection characteristic to involve a higher degree of reflection than said first reflection characteristic.

25. A method according to claim 24, including the steps of:

causing radiation traveling to said viewing location in said first mode according to said first reflection characteristic to be reflected by said first reflective surface but to be free of reflection by said second reflective surface; and causing radiation traveling to said viewing location in said second mode according to said second reflection characteristic to be reflected by said second reflective surface but to be free of reflection by said first reflective surface.

26. A method according to claim 25, including the steps of:

providing said first and second reflective surfaces on opposite sides of a part which is supported for movement between first and second positions; and positioning said part in said first position during said first mode and in said second position during said second mode.

27. A method of operating a head-up display, comprising the steps of:

using an image source to output radiation which represents a visible image;

providing first and second reflective surfaces respectively having first and second reflection characteristics which are different; and directing the radiation from said image source to a viewing location according to a selected one of first and second modes, said first mode including reflection of radiation from said image source by said first reflective surface according to said first reflection characteristic, and said second mode including reflection of radiation from said image source by said second reflective surface according to said second reflection characteristic;

wherein said step of providing said first and second reflective surfaces includes the step of configuring each of said first and second reflective surfaces so as to minimize an amount of ambient light from externally of said head-up display which is reflected thereby in a direction toward said image source.

28. A method according to claim 24, including the step of providing said head-up display in a vehicle having a windshield; and wherein said directing step includes the step of using an inner surface of said windshield to reflect radiation from said image source in each of said first and second modes of operation.

* * * * *